United States Patent
Henkel et al.

(10) Patent No.: US 10,289,091 B2
(45) Date of Patent: May 14, 2019

(54) PARAMETERIZABLE AUTOMATION TECHNOLOGY DEVICE

(71) Applicant: Phoenix Contact GmbH Co. KG, Blomberg (DE)

(72) Inventors: Hartmut Henkel, Blomberg (DE); Jochen Zeuch, Blomberg (DE); Patrick Schweer, Hameln (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 101 days.

(21) Appl. No.: 15/317,287

(22) PCT Filed: Jun. 10, 2015

(86) PCT No.: PCT/EP2015/062905
§ 371 (c)(1),
(2) Date: Feb. 9, 2017

(87) PCT Pub. No.: WO2015/193145
PCT Pub. Date: Dec. 23, 2015

(65) Prior Publication Data
US 2017/0205793 A1  Jul. 20, 2017

(30) Foreign Application Priority Data
Jun. 18, 2014  (DE) .................. 10 2014 108 586

(51) Int. Cl.
*G05B 19/042*  (2006.01)
(52) U.S. Cl.
CPC ............ *G05B 19/0426* (2013.01); *G05B 2219/25092* (2013.01); *G05B 2219/25109* (2013.01);
(Continued)

(58) Field of Classification Search
CPC .......... G05B 2219/25092; G05B 2219/25109; G05B 2219/25153; G05B 2219/25167; G05B 2219/25354; G05B 2219/31197
See application file for complete search history.

(56) References Cited

U.S. PATENT DOCUMENTS

2005/0195537 A1* 9/2005 Virolainen ......... G05B 19/0426
361/18
2006/0145890 A1   7/2006 Junker et al.
(Continued)

FOREIGN PATENT DOCUMENTS

CN  1602507 A  3/2005
CN  1942882 A  4/2007
(Continued)

OTHER PUBLICATIONS

ISA/EP International Search Report, Int'l Application No. PCT/EP2015/062905, dated Aug. 26, 2015, European Patent Office, Rijswijk, NL, 29 pgs.

*Primary Examiner* — Mohamed Barakat
(74) *Attorney, Agent, or Firm* — Holland & Hart LLP

(57) ABSTRACT

The present disclosure relates to a parameterizable automation technology device. The parameterizable automation technology device includes a memory, a wireless communications interface, and a processor. The memory is configured to prestore a device parameter of the parameterizable automation technology device. The wireless communication interface is configured to receive update data to update the prestored device parameter via a communication network. The processor is configured to update the prestored device parameter based on the received update data and to adjust an operation of the parameterizable automation technology device based on the updated prestored device parameter.

17 Claims, 2 Drawing Sheets

(52) U.S. Cl.
CPC .............. *G05B 2219/25153* (2013.01); *G05B 2219/25167* (2013.01); *G05B 2219/25354* (2013.01); *G05B 2219/31197* (2013.01)

(56) References Cited

U.S. PATENT DOCUMENTS

| | | | |
|---|---|---|---|
| 2011/0202145 A1* | 8/2011 | Shah | G05B 19/0426 |
| | | | 700/9 |
| 2012/0040698 A1* | 2/2012 | Ferguson | G05B 19/042 |
| | | | 455/457 |
| 2012/0236769 A1 | 9/2012 | Powell et al. | |
| 2012/0266007 A1 | 10/2012 | Menon et al. | |
| 2014/0138432 A1 | 5/2014 | Park et al. | |
| 2015/0287041 A1* | 10/2015 | Davis | G05B 15/02 |
| | | | 705/304 |

FOREIGN PATENT DOCUMENTS

| | | | |
|---|---|---|---|
| CN | 101194432 A | 6/2008 | |
| CN | 102948223 A | 2/2013 | |
| CN | 103477302 A | 12/2013 | |
| DE | 103 40 621 A1 | 4/2005 | |
| DE | 10340621 A1 * | 4/2005 | ........... G05B 19/042 |
| DE | 10 2006 055 900 A1 | 6/2007 | |
| DE | 10 2006 056 175 | 5/2008 | |
| EP | 1 571 511 A2 | 9/2005 | |
| WO | WO 2012/065758 A1 | 5/2012 | |
| WO | WO 2014/063195 A1 | 5/2014 | |
| WO | WO 2014/063195 A1 | 5/2014 | |

* cited by examiner

PARAMETERIZABLE AUTOMATION TECHNOLOGY DEVICE

CROSS-REFERENCE TO RELATED APPLICATIONS

The present application is a 371 national phase filing of International Application No. PCT/EP2015/062905, entitled "PARAMETERIZABLE AUTOMATION TECHNOLOGY DEVICE", filed 10 Jun. 2015, which claims priority to German Patent Application No. 10 2014 108 586.8, entitled "PAIUMETRISIERBARES AUTOMATISIERUNG-STECHNIKGERÄT", filed 18 Jun. 2014.

BACKGROUND

The present disclosure relates to a parameterizable automation technology device.

A parameterizable automation technology device can comprise a plurality of updatable device parameters. For example, a voltage supply unit often has an updatable and/or adjustable output voltage. A communication device is frequently used to update a device parameter of the parameterizable automation technology device, said device being complexly connected to a contact-based communications interface of the parameterizable automation technology device by means of a wire line. Particularly when updating device parameters of a plurality of parameterizable automation technology devices, establishing a wired connection to update the device parameters can be considered an inconvenient as well as costly process.

SUMMARY

The task on which the disclosure is based is that of specifying an efficient concept for updating a device parameter of a parameterizable automation technology device.

The subject matter solves this task by means of the features of the independent claims. Advantageous examples of the disclosure constitute the subject matter of the figures, the description and the dependent claims.

According to a first aspect of the disclosure, the task is solved by a parameterizable automation technology device, comprising: a memory in which a device parameter of the parameterizable automation technology device is prestored; a wireless communications interface for receiving update data for updating the prestored device parameter via a communications network; and a processor which is designed to update the prestored device parameter on the basis of the received update data and to adjust an operation of the parameterizable automation technology device on the basis of the updated device parameter. This thereby achieves the advantage of being able to efficiently update a device parameter of the parameterizable automation technology device.

The parameterizable automation technology device can be a voltage supply unit, a current supply unit, an amplifier, particularly a measuring amplifier, a circuit breaker, an actuator or a sensor. According to one example, the automation technology device can be an electrical device.

The device parameter can encompass an output voltage, an output current, an amplification factor and/or a switching status. Furthermore, the update data can encompass a target value for the prestored device parameter and/or be in the form of a bit sequence. The update data can further be transmitted to the parameterizable automation technology device by means of a communication device such as a computer or a mobile telephone. According to one example, the received update data can be stored in the memory. Furthermore, the processor can be designed to read out the stored update data from the memory and to update the prestored device parameter on the basis of the update data as read.

The memory can comprise for example an electrically erasable programmable read-only memory (EEPROM). The memory can furthermore be partitioned into a data partition and a communication partition. The prestored device parameter, the updated device parameter and/or the update data can furthermore be stored in the data partition. Information about an update data receipt can furthermore be stored in the communication partition, for example in the form of one or more communication bytes.

The wireless communications interface can be a radio frequency identification interface for communicating by means of radio frequency identification (RFID), e.g. pursuant to the ISO/IEC 14443 or ISO/IEC 18000-3 standard. The wireless communications interface can furthermore be a near-field communications interface for communicating by means of near-field communication (NFC), e.g. pursuant to the ISO/IEC 14443 or ISO/IEC 18092 standard. The wireless communications interface can furthermore be configured to communicate pursuant to the Bluetooth, ZigBee or Wireless Local Area Network (WLAN) standard. Furthermore, the wireless communications interface can be connected directly to the memory. For example, the wireless communications interface and the memory form a near-field communication memory or an NFC-EEPROM.

The communications network can be a wireless network, e.g. a near-field communications network, a telephone network, e.g. a mobile telephone network, a computer network, e.g. a Wireless Local Area Network, and/or the internet.

The processor can be incorporated into a microprocessor or form a microprocessor. The processor can furthermore be connected to the memory via a serial interface, e.g. in accordance with one of the Serial Peripheral Interface (SPI) or Inter-Integrated Circuit (I2C) standards. The processor can furthermore be designed to recognize receipt of the update data from a readout of information on the receipt of the update data from the communication partition of the memory. The information is for example stored in the form of a bit in the communication partition; if the bit is set to 0, there are no update data. If, on the other hand, the bit is set to 1, there are then update data. The processor can furthermore be designed to delete or overwrite the information stored in the communication partition on an update data receipt. For example, the processor deletes the information after the prestored device parameter has been updated.

The processor can be designed to adjust the updated device parameter in order to adjust the operation of the parameterizable automation technology device. For the example of the parameterizable automation technology device being a voltage supply unit and the device parameter an output voltage of the voltage supply unit, the processor adjusts an output voltage of the voltage supply unit to the target value for the output voltage comprised in the updated device parameter in order to adjust the operation of the voltage supply unit.

According to one example, the processor can be designed to replace the device parameter prestored in the memory with the updated device parameter or overwrite it with the updated device parameter.

According to a further example, the wireless communications interface and/or the memory for receiving the update data can be supplied with electrical energy wirelessly and the update data received can be stored in the memory. The parameterizable automation technology device can thereby be deactivated. In particular, the parameterizable automation technology device can thereby be packaged into a box, e.g. a carton, or removed from a control cabinet. The processor can furthermore be designed to read out the information on an update data receipt stored in the communication partition upon the activation of the parameterizable automation technology device and to update the prestored device parameter as need be.

In one advantageous example of the parameterizable automation technology device, the processor is furthermore designed to check the received update data for data transmission errors and to reject the received update data in the event of a data transmission error. This thereby achieves the advantage of being able to prevent misadjustment of the parameterizable automation technology device.

The processor can be designed to check whether a device parameter comprised in the update data falls short of a first threshold and/or exceeds a second threshold in order to check the received update data for data transmission errors. The update data can furthermore include the device parameter multiple times and the processor can be further designed to detect a data transmission error by comparing the values of the device parameter stored multiple times. The processor can furthermore be designed to check whether the device parameter contained in the update data conflicts with a further prestored device parameter in order to check the received update data for data transmission errors.

The processor can furthermore be designed to delete the update data in order to reject the update data. The processor can furthermore be designed to delete or overwrite the information on the receipt of the update data stored in the communication partition in order to reject the update data.

According to one example, the check of the update data for data transmission errors can furthermore correspond to a protection against manipulation or provide a protection against manipulation.

According to one example, the processor can be designed to check the received update data for data transmission errors upon an activating of the parameterizable automation technology device, for example subsequent to reading out the information on an update data receipt stored in the communication partition upon activation of the parameterizable automation technology device.

In a further advantageous example of the parameterizable automation technology device, the processor is further designed to check the received update data for data transmission errors on the basis of a checksum and to reject the received update data in the event of a data transmission error. This thereby achieves the advantage of being able to efficiently detect a data transmission error.

The update data and/or the device parameter can be checked for data transmission errors by means of a cyclic redundancy check, for example in accordance with the Cyclic Redundancy Check 8 (CRC-8) standard.

In a further advantageous example of the parameterizable automation technology device, the processor is further designed to check the received update data for access authorization by decrypting the received update data and to reject the received update data in the absence of an access authorization. This thereby achieves the advantage of being able to provide efficient access protection in the updating of the prestored device parameter.

The update data can be generated by means of XOR encryption of a device parameter using a predetermined key. The processor can furthermore be designed to decrypt the device parameter by means of XOR decryption using the predetermined key and to replace the prestored device parameter with the decrypted device parameter in order to update the prestored device parameter.

In a further advantageous example of the parameterizable automation technology device, the processor is further designed to store information on access authorization absence in the memory. This thereby achieves the advantage of being able to document the lack of an access authorization and retrieve it at a later point in time.

In a further advantageous example of the parameterizable automation technology device, the processor is furthermore designed to store information on an existing data transmission error in the memory. This thereby achieves the advantage of being able to run a check as to the cause of a data transmission error at a later point in time.

The information can be stored in the communication partition of the memory, for example in the form of one or more communication bytes. Furthermore, the information can include a type of error, such as the further device parameter comprised in the update data falling short of a threshold, or an error address. The information can further indicate the absence of a data transmission error. According to one example, the information can encompass the update data.

According to one example, a successful updating of the prestored device parameter or an effective acquisition of the update data can furthermore be signaled by means of the information.

In a further advantageous example of the parameterizable automation technology device, the wireless communications interface is designed to transmit information on an existing data transmission error over the communications network or to make it available for readout. This thereby achieves the advantage of being able to transmit the information for updating the device parameter of the parameterizable automation technology device to a communication device.

In a further advantageous example of the parameterizable automation technology device, the parameterizable automation technology device is one of the following automation technology devices: a voltage supply unit, a current supply unit, an amplifier, particularly a measuring amplifier, a circuit breaker, an actuator or a sensor.

In a further advantageous example of the parameterizable automation technology device, the device parameter encompasses one or more of the following device parameters: an output voltage, an output current, an amplification factor or a switching status.

The output voltage is for example 1V, 5V, 10V, 12V, 24V, 50V, 100V, 500V, 1 kV, 2 kV or 5 kV. Furthermore, the output current can amount to 0.01 mA, 1 mA, 10 mA, 100 mA, 1 A, 5 A or 10 A. The amplification factor can furthermore amount to 1.01, 1.1, 1.5, 2, 5, 10, 25, 50, 100, 500 or 1000. The switching status can furthermore be open or closed.

In a further advantageous example of the parameterizable automation technology device, the wireless communications interface is further designed to transmit an identifier of the parameterizable automation technology device to a communication device over the communications network. This thereby achieves the advantage of the communication device being able to clearly identify the parameterizable automation technology device by means of the identifier.

The identifier can encompass a serial number of the parameterizable automation technology device. Furthermore, the communication device can be a programming device for updating the prestored device parameter of the parameterizable automation technology device, for example a computer, mobile telephone or a smartphone.

In a further advantageous example of the parameterizable automation technology device, the wireless communications interface is supplied with electrical energy wirelessly. This thereby achieves the advantage of the update data being able to be received in a deactivated state of the parameterizable automation technology device.

In a further advantageous example of the parameterizable automation technology device, the wireless communications interface is further designed to supply the memory with electrical energy. This thereby achieves the advantage of the update data being able to be received and stored in the memory in a deactivated state of the parameterizable automation technology device.

In a further advantageous example of the parameterizable automation technology device, the wireless communications interface comprises a near-field communications interface. This thereby achieves the advantage of being able to use a wireless communications interface able to be efficiently and wirelessly supplied with electrical energy.

The near-field communications interface can be designed to communicate by means of near-field communication (NFC), e.g. pursuant to the ISO/IEC 14443 or ISO/IEC 18092 standard.

In a further advantageous example of the parameterizable automation technology device, the wireless communications interface is disposed within a housing of the parameterizable automation technology device or in a wall of the parameterizable automation technology device housing. This thereby achieves the advantage of being able to integrate the wireless communications interface into the parameterizable automation technology device taking up very little space.

In a further advantageous example of the parameterizable automation technology device, the wireless communications interface comprises an antenna arranged within a housing of the parameterizable automation technology device or integrated into a wall of the parameterizable automation technology device housing. This thereby achieves the advantage of enabling a particularly compact design to the parameterizable automation technology device.

The antenna can be formed by circuit paths on a circuit board or printed circuit board. Furthermore, the housing can be a plastic housing or can comprise a housing element through which electromagnetic signals can pass.

According to a second aspect of the disclosure, the task is solved by a method for the parameterizing of a parameterizable automation technology device which comprises: wirelessly transmitting update data for updating a prestored device parameter of the parameterizable automation technology device to the parameterizable automation technology device over a communications network; updating the prestored device parameter on the basis of the update data received; and adjusting an operation of the parameterizable automation technology device on the basis of the updated device parameter. This thereby achieves the advantage of being able to specify an efficient method for updating a device parameter of parameterizable automation technology device.

The method can be realized using the above-described parameterizable automation technology device and a communication device for transmitting the update data to the parameterizable automation technology device. The communication device can be a computer, a mobile telephone or a smartphone.

In one advantageous example of the method, the method further comprises the procedural steps of: checking the received update data for data transmission errors; and rejecting the received update data in the event of a data transmission error. This thereby achieves the advantage of being able to prevent incorrect adjustment of the parameterizable automation technology device.

In one further advantageous example of the method, the method further comprises the procedural step of: storing information on an existing data transmission error in a memory of the parameterizable automation technology device. This thereby achieves the advantage of being able to run a check as to the cause of an existing data transmission error at a later point in time.

BRIEF DESCRIPTION OF THE DRAWINGS

Examples of the principles of this disclosure are depicted in the drawings and will be described in greater detail below.

DETAILED DESCRIPTION

Figure 1:
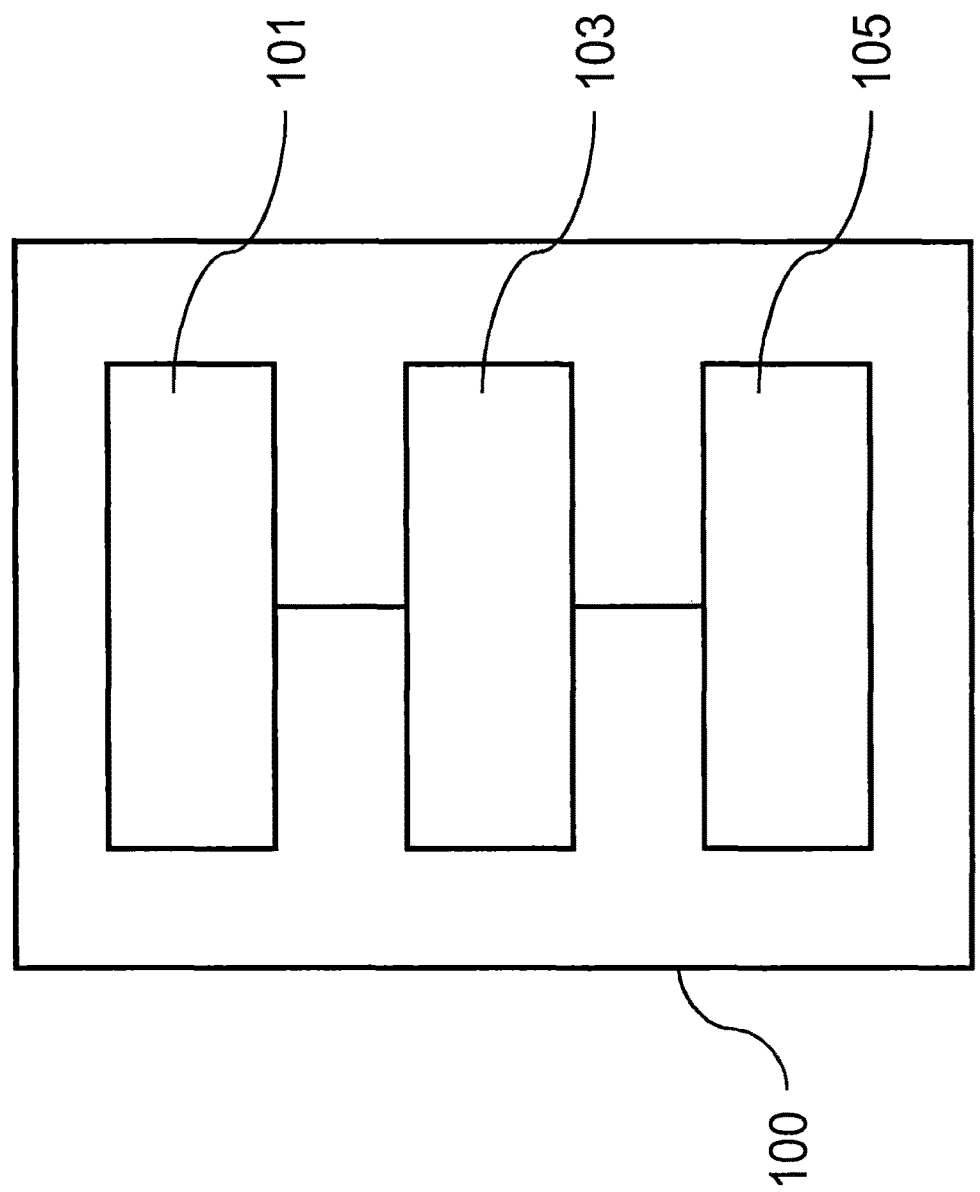
FIG. 1 a schematic diagram of a parameterizable automation technology device according to one example.

FIG. 1 shows a schematic diagram of a parameterizable automation technology device 100 according to one example. The parameterizable automation technology device 100 comprises a memory 101, a wireless communications interface 103, and a processor 105.

The parameterizable automation technology device 100 can be configured with: the memory 101, in which a device parameter of the parameterizable automation technology device 100 is prestored; the wireless communications interface 103 for receiving update data to update the prestored device parameter via a communications network; and the processor 105, which is designed to update the prestored device parameter on the basis of the received update data and adjust an operation of the parameterizable automation technology device 100 based on the updated device parameter.

The parameterizable automation technology device 100 can be a voltage supply unit, a current supply unit, an amplifier, particularly a measuring amplifier, a circuit breaker, an actuator or a sensor. According to one example, the automation technology device 100 can be an electrical device.

The device parameter can encompass an output voltage, an output current, an amplification factor and/or a switching status. Furthermore, the update data can encompass a target value for the prestored device parameter and/or be in the form of a bit sequence. The update data can further be transmitted to the parameterizable automation technology device 100 by means of a communication device such as a computer or mobile telephone. According to one example, the received update data can be stored in the memory 101. Furthermore, the processor 105 can be designed to read out the stored update data from the memory 101 and to update the prestored device parameter on the basis of the update data as read.

The memory 101 can comprise for example an electrically erasable programmable read-only memory (EEPROM). The memory 101 can furthermore be partitioned into a data partition and a communication partition. The prestored device parameter, the updated device parameter and/or the update data can furthermore be stored in the data partition. Information about an update data receipt can furthermore be stored in the communication partition, for example in the form of one or more communication bytes.

The wireless communications interface 103 can be a radio frequency identification interface for communicating by means of radio frequency identification (RFID), e.g. pursuant to the ISO/IEC 14443 or ISO/IEC 18000-3 standard. The wireless communications interface 103 can furthermore be a near-field communications interface for communicating by means of near-field communication (NFC), e.g. pursuant to the ISO/IEC 14443 or ISO/IEC 18092 standard. The wireless communications interface 103 can furthermore be configured to communicate pursuant to the Bluetooth, ZigBee or Wireless Local Area Network (WLAN) standard. Furthermore, the wireless communications interface 103 can be connected directly to the memory 101. For example, the wireless communications interface 103 and the memory 101 form a near-field communication memory or an NFC-EEPROM.

The communications network can be a wireless network, e.g. a near-field communications network, a telephone network, e.g. a mobile telephone network, a computer network, e.g. a Wireless Local Area Network, and/or the internet.

The processor 105 can be incorporated into a microprocessor or form a microprocessor. The processor 105 can furthermore be connected to the memory via a serial interface, e.g. in accordance with one of the Serial Peripheral interface (SPI) or Inter-Integrated Circuit (I2C) standards. The processor 105 can furthermore be designed to recognize receipt of the update data from a readout of information on the receipt of the update data from the communication partition of the memory 101. The information is for example stored in the form of a bit in the communication partition; if the bit is set to 0, there are no update data. If, on the other hand, the bit is set to 1, there are then update data. The processor 105 can furthermore be designed to delete or overwrite the information stored in the communication partition on an update data receipt. For example, the processor 105 deletes the information after the prestored device parameter has been updated.

The processor 105 can be designed to adjust the updated device parameter in order to adjust the operation of the parameterizable automation technology device 100. For the example of the parameterizable automation technology device 100 being a voltage supply unit and the device parameter an output voltage of the voltage supply unit, the processor 105 adjusts an output voltage of the voltage supply unit to the target value for the output voltage comprised in the updated device parameter in order to adjust the operation of the voltage supply unit.

According to one example, the processor 105 can be designed to replace the device parameter prestored in the memory 101 with the updated device parameter or overwrite it with the updated device parameter.

According to a further example, the wireless communications interface 103 and/or the memory 101 for receiving the update data can be supplied with electrical energy wirelessly and the update data received stored in the memory 101. The parameterizable automation technology device 100 can thereby be deactivated. In particular, the parameterizable automation technology device 100 can thereby be packaged into a box, e.g. a carton, or removed from a control cabinet. The processor 105 can furthermore be designed to read out the information on an update data receipt stored in the communication partition upon the activation of the parameterizable automation technology device 100 and to update the prestored device parameter as need be.

According to a further example, the update data for the parameterizable automation technology device 100 can be written to and/or read from a near-field communication memory or NFC-EEPROM, formed by the memory 101 and the wireless communications interface 103 comprising the near-field communications interface, by means of near-field communication or by wireless means, and the near-field communication memory or NFC-EEPROM can simultaneously be supplied with electrical energy, whereby no check for data transmission errors is made during the writing and/or reading.

According to a further example, communication bytes can be set in the communication partition of the memory 101 which signal whether the prestored device parameter was updated or the update data were applied. The communication partition can furthermore be read so as to obtain the communication bytes when the parameterizable automation technology device 100 is in a deactivated state. In this respect, the parameterizable automation technology device 100 can be removable, for example can be removed out of a control cabinet.

According to a further example, the parameterizable automation technology device 100 can be parameterized or configured wirelessly via a near-field communications interface which can be incorporated into the wireless communications interface 103. This allows the writing of update data from a transmitter such as a computer, a mobile telephone or a smartphone to an economical memory capable of near-field communication such as the memory 101. The update data received can be checked by the processor 105 or a microprocessor in the parameterizable automation technology device 100, for example for data transmission errors. Furthermore, the received update data and/or a result of the received update data check can be transmitted or fed back to the transmitter. To this end, the processor 105 or a microprocessor can be supplied with electrical energy, for example by an electrical power supply of the parameterizable automation technology device 100 or a battery. Furthermore, in the case of wirelessly supplying the wireless communications interface 103 with electrical energy, the processor 105 can be supplied with electrical energy by the wireless communications interface 103.

According to a further example, in the case of a parameterization or configuration of the parameterizable automation technology device 100 by a near-field communication memory or NFC-EEPROM, formed by the memory 101 and the wireless communications interface 103 comprising the near-field communications interface, wireless communication can be established with a near-field communication transmitter, whereby for example errors in the parameterization or configuration can be reported back. To this end, the parameterizable automation technology device 100 can be parameterized or configured in a deactivated state of the parameterizable automation technology device 100 when no energy is being supplied to the parameterizable automation technology device 100.

According to a further example, during an operation of the parameterizable automation technology device 100, a communication between the parameterizable automation technology device 100 and the transmitter by means of a near-field communication may not be provided, since near-field communication can be compromised by interference transmissions or a function of the wireless communications interface 103 or the memory 101 at high temperatures, e.g. temperatures higher than 70° C. Furthermore, the close positioning of a plurality of parameterizable automation technology devices 100 can hinder an identifying of an individual parameterizable automation technology device 100 from the plurality of parameterizable automation technology devices 100 for the purpose of individual parameterization.

Figure 2:
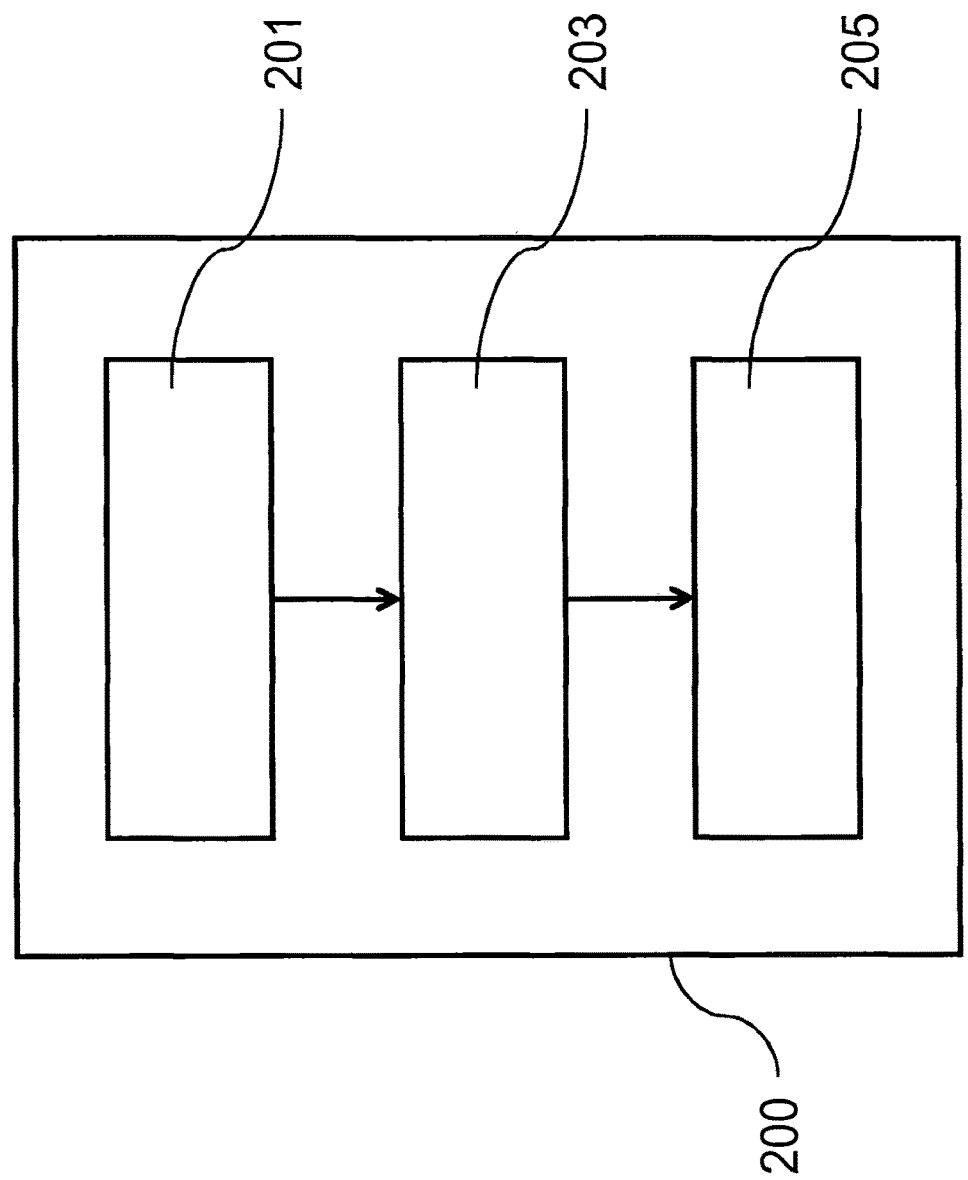
FIG. 2 a schematic diagram of a method for parameterizing a parameterizable automation technology device according to one example.

FIG. 2 shows a schematic diagram of a method 200 for parameterizing a parameterizable automation technology device 100 according to one example. The method 200 comprises the procedural steps of a wireless transmission 201, an update 203, and an adjustment 205.

The method 200 for parameterizing the parameterizable automation technology device 100 can comprise the following procedural steps: wirelessly transmitting 201 update data for updating a prestored device parameter of the parameterizable automation technology device 100 to the parameterizable automation technology device 100 over a communications network; updating 203 the prestored device parameter on the basis of the update data received; and adjusting 205 an operation of the parameterizable automation technology device 100 on the basis of the updated device parameter.

The method 200 can be realized using the parameterizable automation technology device 100 shown in FIG. 1 and a communication device for transmitting the update data to the parameterizable automation technology device 100. The communication device can be a computer, a mobile telephone or a smartphone.

All of the features described and shown in connection with individual examples of the principles of this disclosure can be provided in different combinations in the inventive subject matter so as to realize their advantageous effects simultaneously.

The protective scope of the present disclosure is conferred by the claims and is not limited by the features defined in the description or illustrated in the figures.

LIST OF REFERENCE NUMBERS

100 parameterizable automation technology device
101 memory
103 wireless communications interface
105 processor
200 method
201 wireless transmission
203 update
205 adjustment

What is claimed is:

1. A parameterizable automation technology device, comprising:
a memory configured to prestore a device parameter of the parameterizable automation technology device;
a wireless communications interface configured to receive update data to update the prestored device parameter via a communications network; and
a processor configured to update the prestored device parameter based on the received update data and to adjust an operation of the parameterizable automation technology device based on the updated prestored device parameter, wherein the processor is further configured to check the received update data for data transmission errors and to reject the received update data in response to a data transmission error;
wherein the memory is partitioned into a data partition and a communication partition; wherein the data partition is configured to store one or more of the prestored device parameter, the updated device parameter, or the update data; wherein the communication partition is configured to store information about an update data receipt.

2. The parameterizable automation technology device according to claim 1, wherein the processor is further configured to store information on an existing data transmission error in the memory.

3. The parameterizable automation technology device according to claim 1, wherein the wireless communications interface is configured to transmit information on an existing data transmission error over the communications network or to make the existing data transmission error available to readout.

4. The parameterizable automation technology device according to claim 1, wherein the parameterizable automation technology device is one of the following automation technology devices: a voltage supply unit, a current supply unit, an amplifier, particularly a measuring amplifier, a circuit breaker, an actuator or a sensor.

5. The parameterizable automation technology device according to claim 1, wherein the device parameter comprises one or more of the following device parameters: an output voltage, an output current, an amplification factor or a switching status.

6. The parameterizable automation technology device according to claim 1, wherein the wireless communications interface is further configured to transmit an identifier of the parameterizable automation technology device to a communication device over the communications network.

7. The parameterizable automation technology device according to claim 1, wherein the wireless communications interface is configured to be supplied with electrical energy wirelessly.

8. The parameterizable automation technology device according to claim 1, wherein the wireless communications interface is further configured to supply the memory with electrical energy.

9. The parameterizable automation technology device according to claim 1, wherein the wireless communications interface comprises a near-field communications interface.

10. The parameterizable automation technology device according to claim 1, wherein the wireless communications interface is disposed within a housing of the parameterizable automation technology device or in a wall of the housing of the parameterizable automation technology device.

11. The parameterizable automation technology device according to claim 1, wherein the wireless communications interface comprises an antenna arranged within a housing of the parameterizable automation technology device or integrated into a housing wall of the parameterizable automation technology device.

12. A method for the parameterizing of a parameterizable automation technology device, comprising:
wirelessly receiving update data, configured for updating a prestored device parameter of the parameterizable automation technology device, over a communications network;
updating the prestored device parameter based on the update data received;
adjusting an operation of the parameterizable automation technology device based on the updated prestored device parameter;
checking the received update data for data transmission errors; and
rejecting the received update data in response to a data transmission error;

storing on a data partition of a memory of the parameterizable automation technology device one or more of: the prestored device parameter, the updated device parameter, or the update data; and storing on a communication partition of the memory information about an update data receipt.

13. The method according to claim 12, comprising:
storing information on an existing data transmission error in the memory of the parameterizable automation technology device.

14. The method according to claim 12, comprising:
transmitting information on an existing data transmission error over the communications network.

15. The method according to claim 12, comprising making an existing data transmission error available to readout.

16. The method according to claim 12, comprising:
transmitting an identifier of the parameterizable automation technology device.

17. The method according to claim 16, wherein the identifier is a serial number of the parameterizable automation device.

\* \* \* \* \*